(12) United States Patent
Uchida

(10) Patent No.: US 6,986,879 B2
(45) Date of Patent: Jan. 17, 2006

(54) METHOD FOR PRODUCING COMPLEX METAL OXIDE POWDER

(75) Inventor: Yoshio Uchida, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/976,010

(22) Filed: Oct. 15, 2001

(65) Prior Publication Data

US 2002/0064499 A1    May 30, 2002

(30) Foreign Application Priority Data

Oct. 16, 2000  (JP) .............................. 2000-314923

(51) Int. Cl.
*C01G 23/00*   (2006.01)
*C01G 35/00*   (2006.01)
*C01G 29/00*   (2006.01)
*C01G 49/00*   (2006.01)
*C01F 11/00*   (2006.01)

(52) U.S. Cl. .............................. 423/593.1; 423/594.2; 423/594.8; 423/594.12; 423/598

(58) Field of Classification Search ............. 423/593.1, 423/598, 594.2, 594.8, 594.12
See application file for complete search history.

(56) References Cited

U.S. PATENT DOCUMENTS

| | | | |
|---|---|---|---|
| 5,688,480 A | 11/1997 | Mohri et al. | |
| 5,846,505 A | 12/1998 | Saegusa | |

FOREIGN PATENT DOCUMENTS

| | | | |
|---|---|---|---|
| EP | 366313 | * | 5/1990 |
| EP | 0 666 239 A1 | | 8/1995 |
| EP | 0 714 850 A2 | | 6/1996 |
| EP | 1 065 693 A2 | | 1/2001 |
| JP | 7-187612 | | 7/1995 |
| JP | 8-119745 | | 5/1996 |
| JP | 8-133832 | | 5/1996 |
| JP | 8-208226 | | 8/1996 |

* cited by examiner

*Primary Examiner*—Steven Bos
(74) *Attorney, Agent, or Firm*—Sughrue Mion, PLLC

(57) ABSTRACT

A complex metal oxide powder composed of fine particles, each in an approximately spherical shape, is provided by a method for producing a complex metal oxide powder, which method comprises heating at least two kinds of metal salts, or a complex metal salt comprising at least two kinds of metals, to a temperature at which transition to a complex metal oxide occurs, and calcining the metal salts or the complex metal salt in an atmosphere containing a halogenated hydrogen gas.

9 Claims, No Drawings

METHOD FOR PRODUCING COMPLEX METAL OXIDE POWDER

FIELD OF THE INVENTION

The present invention relates to a method for producing a complex metal oxide powder. It particularly relates to a method for producing a complex metal oxide powder suitable as a material for electronic components such as multilayer capacitors, actuators, filters, etc.

BACKGROUND OF THE INVENTION

Complex metal oxide powders are used as materials for high-performance electronic components such as phosphors, dielectrics, piezoelectrics, ferroelectrics, ferrite, etc. Particularly, titanate powders provide an excellent performance as dielectrics, ferroelectrics, piezoelectrics, and pyroelectrics, etc., and are used in, for instance, multilayer capacitors, actuators, and filters. In response to demands for reducing the sizes of electronic devices, studies for reducing the sizes of these electronic components are promoted, and the complex metal oxide powders as materials have been improved so as to be suitable for the size-reduced electronic components.

For instance, in a multilayer capacitor formed by using barium titanate, which is one of titanates as complex metal oxides, dielectric layers that form a capacitor are made of sintered barium titanate, and one layer is as thin as 10 $\mu$m. To achieve this thickness, the barium titanate particles are required to be fine particles with a mean primary particle diameter of not more than 0.3 $\mu$m.

Besides, as a sintered products are generally required to have finer grain size to increase the mechanical strength of electronic components, complex metal oxide powders as materials of sintered products are required to have finer particles. In the case where particles have an approximately spherical particle shape, the sintering property is improved. Therefore, complex metal oxide powders having fine particle in an approximately spherical particle shape are demanded.

Conventionally, as a method for producing a complex metal oxide, the solid phase synthesis has been known, in which powders of metal element compounds are mixed and calcined, and an obtained complex metal oxide is crushed. Besides, the wet processes are also known, for instance, the hydrolysis of alkoxide method in which alkoxides of metal elements composing a complex metal oxide is hydrolyzed and precipitates thus obtained are dried and calcined, the hydroxide method in which precipitates obtained by neutralization of an aqueous solution containing metal elements composing a complex metal oxide is dried, calcined, and crushed, and the hydrothermal synthesis method in which an aqueous solution containing compounds of metal elements composing a complex metal oxide is heated under a high pressure.

The solid phase method and the hydroxide method are economical methods suitable for industrial manufacture, but they require an intensive milling step, which has drawbacks of contamination in a powder due to the chipping of a ball or the like used in a ball mill, and fine particles tend to aggregate because of high surface energy.

Therefore, by such a conventional method, it is difficult to produce a complex metal oxide fine powder used as a material for a dielectric layer of a multilayer capacitor that is required to be further thinner.

JP8(1996)-119745A discloses a method for producing a perovskite-structure oxide powder made of barium titanate or the like by the hydrothermal synthesis method. However, since including a heat treatment at 200° C. under a pressure of 20 Kg/cm$^2$, the method requires a specific device, and is not deemed to be a costly advantageous producing method.

JP7(1995)-187612A discloses a method for producing a complex metal oxide powder having a mean primary particle diameter of 1.0 $\mu$m to 45 $\mu$m and having an approximately spherical particle shape by calcination in a hydrogen halide gas, but from the viewpoint of making particles finer, it is not sufficient yet.

JP8(1996)-208226A discloses a method for producing a complex metal oxide powder having a mean primary particle diameter of 0.3 $\mu$m and having an approximately spherical shape by calcination in an iodine atmosphere. The method in which iodine is vaporized for use, however, cannot be considered as a method advantageous for industrial manufacture.

An object of the present invention is to provide a method for producing a complex metal oxide powder whose particles are very fine, each in an approximately spherical particle shape.

SUMMARY OF THE INVENTION

The inventor of the present invention earnestly studied to solve the foregoing problem, and consequently succeeded in completing the present invention.

More specifically, the present invention provides a method for producing a complex metal oxide powder, comprising the step of heating at least two kinds of metal salts or a complex metal salt comprising at least two kinds of metals to a temperature at which transition to a complex metal oxide occurs, and then, calcining the metal salts or the complex metal salt in an atmosphere containing a hydrogen halide gas.

DETAILED DESCRIPTION OF THE INVENTION

A metal salt used in the present invention is a metal salt that is used as a material in production of a complex metal oxide and that provides a metal oxide when calcined, and it may be any one of inorganic metal salts and organic metal salts. From the viewpoint of the availability, it is preferably an inorganic metal salt. Examples of an inorganic metal salt include metal oxides, metal carbonate salts, metal hydroxides, gel of metal hydroxides, etc. Further, as will be described later, metal halide salts may be used, such as metal fluoride salts, metal chloride salts, metal bromide salts. It should be noted that the above-described metal salts other than the metal halide salts may be referred to as "non metal halide salts" in some cases.

These metal salts may be those available commercially, or those obtained by known methods, such as the wet synthesis method, the sol-gel method using an alkoxide compound, the method (hydroxide method) in which precipitates of a hydroxide is obtained from an aqueous solution by neutralizing reaction, etc. Furthermore, the combination of the metal salts to be used may be selected variously, according to a kind of a complex metal oxide to be obtained.

The complex metal salt used in the present invention is a metal salt made of at least two kinds of metals, which is used as a material in production of a complex metal oxide and which provides a metal oxide when calcined. It may be any one of inorganic complex metal salts and organic complex metal salts, but from the viewpoint of the availability, it is preferably an inorganic complex metal salt. Examples of an inorganic metal salt include complex metal oxides, complex metal carbonate salts, complex metal hydroxides, and further, inorganic complex metal oxides having not less than two kinds of anion groups. In the case where a complex metal oxide has not less than two kinds of anion groups, as will be described later, one of the anion groups may be a halogen atom such as fluorine, chlorine, bromine. As these complex metal salts, those available commercially are normally used, but they may be prepared by known methods. For instance, in the case where the complex metal oxide is barium titanate ($BaTiO_3$), titanyl barium oxalate tetrahydrate as a complex compound of titanium and barium may be used as a material.

In the present invention, in the case where at least two kinds of metal salts are used, they may be mixed by a dry method or a wet method before a heat treatment that will be described later. For the mixing, a normal mixing method that is industrially used may be used, and examples of a mixing device used herein include a ball mill, a vibrating mill, a Henschel mixer, a vertical granulator, a dynamic mill, etc. The complex metal salt is variously selected, according to a complex metal oxide to be obtained.

In the producing method of the present invention, the aforementioned at least two kinds of metal salts or the complex metal salt (hereinafter sometimes referred to as a metal salt material) is heated to a temperature at which transition of a metal salt material to a complex metal oxide occurs. Herein, "the temperature at which transition of a metal salt material to a complex metal oxide occurs" varies with the kinds of material metals, etc., but a temperature at which the transition to a complex metal oxide occurs and a temperature at which the formation of the complex metal oxide is finished can be determined beforehand according to a change in weight of metal salts that is determined by the thermogravimetric-differential thermal analysis (TG-DTA) or the like. For instance, when a metal salt material is heated and observed by TG-DTA, a peak of exothermic reaction is observed at a temperature at which transition to a complex metal salt oxide occurs. The temperature at the rising of the peak of exothermic reaction is regarded as a temperature at which transition to the complex metal oxide occurs. Besides, normally, the temperature at which the formation of a complex metal oxide is finished is 0° C. to about 400° C. higher than the temperature at which the transition to the complex metal oxide occurs.

First, the metal salt material is heated to "the temperature at which the transition of the metal salt material to the complex metal oxide occurs", which has been determined beforehand by the method as described above. The heating method is not particularly limited. The heating to the determined temperature may be carried out by heating the metal salt material in a calcining furnace while the calcining furnace is heated together, or putting the metal salt material into a calcining furnace that has been heated to the determined temperature beforehand may be carried out. The heating of the metal salt material and the calcination that will be described later may be carried out in different furnaces, respectively.

After heating to "the temperature at which the transition of the metal salt material to the complex metal oxide occurs", calcination is carried out. The calcination is carried out in the presence of hydrogen halide gas. It should be noted that the hydrogen halide gas is hydrogen fluoride gas, hydrogen chloride gas, hydrogen bromide gas, or a gas obtained by mixing these gases. Hydrogen chloride gas is preferable among these hydrogen halide gas. It should be noted that the heating of the metal salt material is in the substantial absence of hydrogen halide gas. Herein, the "substantial absence" means that the gas is at a concentration in a range such as not to affect the object of the present invention, and normally not more than about 0.1 vol %. After heating to the temperature at which the transition of the metal salt material to the complex metal oxide occurs, the calcination is carried out in the presence of hydrogen halide gas.

For the calcination in the presence of hydrogen halide gas, hydrogen halide gas may be fed to the calcining furnace after the heating to the temperature at which the transition of the metal salt material to the complex metal oxide occurs. The method for feeding hydrogen halide gas is not particularly limited, and it maybe fed directly from a commercially available cylinder or the like, or a compound that generates hydrogen halide at a calcination temperature may be provided in the calcining furnace beforehand.

In the case where hydrogen halide gas is fed into the calcining furnace after the heating, preferably, the feeding of hydrogen halide gas is fed immediately after the metal salt material is heated to the temperature at which the transition to the complex metal oxide occurs, for instance, when a proportion of transition of the metal salt material is not more than 50%, preferably not more than 30%.

As a compound that generates hydrogen halide at the calcination temperature, the metal salt material containing a halogen atom is preferable. For instance, in the case where at least two kinds metal salts are used, at least one of the metal compounds is a metal halide salt such as a fluoride, a chloride, a bromide. In the case where a complex metal salt is used, the complex metal salt preferably contains a halogen atom such as fluorine, chlorine, and bromine. In the case where a metal halide salt is used, at least one of the other metal salts is preferably non-halogenated substance. In the case where a complex metal salt containing a halogen atom, the complex metal salt preferably further contains a non-halogen atom.

In the case where a metal halide salt is used, a "non metal halide salt" composed of the same metal as that of the metal halide salt is preferably used. In this case, the "non metal halide" and the metal halide are used at a molar ratio of 99.9:0.1 to 90:10, and preferably at a molar ratio of 99:1 to 95:5. For instance, in the case where a perovskite-structure oxide is barium titanate ($BaTiO_3$), barium carbonate, barium fluoride, and titanium oxide are weighed and mixed so that barium and titanium are at a molar ratio of 1:1, and a molar ratio of barium carbonate and barium fluoride is preferably in a range of 99.9:0.1 to 90:10.

As an effect of the supply of halogenated hydrogen gas at the foregoing specific temperature, it is considered that a powder whose particles are very fine and hardly aggregate can be obtained.

For preparing the "non metal halide salt", a method called as wet method is applicable, and examples of the same include a method in which a product by hydrolysis of alkoxide of a metal element is separated and dried, and a method in which a precipitate obtained by precipitating a hydroxide from an aqueous solution containing a cation of a metal element by a neutralizing reaction is separated and dried. Particularly preferable is a method in which a precipitate obtained by precipitating a hydroxide from an aqueous solution containing a cation of the metal element by a neutralizing reaction with use of an oxalic acid is separated and dried.

In the calcining step in the producing method of the present invention, apart from hydrogen halide, an inert gas such as nitrogen or argon, or air, preferably coexists. Air is more preferable. The gas preferably contains less moisture, and a concentration of water vapor is preferably less than about 2 vol %. In the case where a gas other than hydrogen halide coexists, a concentration of hydrogen halide gas is preferably in a range of about 1 vol % to about 10 vol %, and more preferably in a range of about 1 vol % to about 7 vol %.

A calcination time is about 0.5 hour to about 5 hours, preferably about 1 hour to about 3 hours, though depending on influences of the material and the particle diameter. A calcination temperature is normally not lower than about 500° C. and not higher than about 1000° C., and preferably not lower than about 700° C. and not higher than about 900° C.

Examples of a complex metal oxide obtained by the foregoing method include $MgTiO_3$, $BaTiO_3$, $CaTiO_3$, $SrTiO_3$, $(Ba,Sr)TiO_3$, $Ba(Ti,Zr)O_3$, $Pb(Zr,Ti)_3$, $PbTiO_3$, $SrBi_2Ta_2O_9$, $SrBi_2(Ta,Nb)O_9$, $FeBaO_3$, etc. Among these, $MgTiO_3$, $BaTiO_3$, $CaTiO_3$, and $SrTiO_3$ are usable as materials for electronic components such as multilayer capacitors, actuators, filters, etc. Among them, those which are called perovskite-structure oxides are preferable.

In the case where the perovskite-structure oxide is barium titanate ($BaTiO_3$), it is possible to use titanyl barium oxalate tetrahydrate as a material, which is a complex compound of titanium and barium. In this case, for instance, barium fluoride may be added as a halogenated metal element, and titanium oxide may be added to make titanium and barium have a molar ratio of 1:1.

According to the present invention, the generated complex metal oxide particles hardly grow to large size, and particles hardly aggregate due to fusion between particles. Therefore, it is possible to produce a complex metal oxide powder whose particles are very fine and excellent dispersibility.

As a material has a smaller primary particle diameter, the calcination temperature tends to decrease, and the powder tends to have a smaller particle diameter.

Furthermore, it is possible to control the particle diameter by adding a complex oxide in a fine particle form, which serve as seed crystal. For instance, in the case of barium titanate, the particle diameter can be decreased by adding $BaTiO_3$ in a fine particle form to a material.

Furthermore, by the producing method of the present invention, a complex metal oxide powder whose particles have an approximately spherical shape and a uniform diameter is produced.

Since the complex metal oxide powder produced by the producing method of the present invention contains a small amount of aggregated particles and aggregated very weakly, only small milling energy is required for dispersing aggregated particles, and hence, a short-period milling operation by a ball mill or a vibrating mill suffices to disperse the same. Consequently, the miling operation can be carried out substantially without contamination due to the chipping of a medium such as a ball in a ball mill, as well as without causing particles to aggregate due to mill packing.

If necessary, halogen ions can be removed readily by water washing. For instance, in the case where the milling of a calcined product is carried out by a wet method, halogen ions can be dissolved and removed.

A complex metal oxide powder produced by the producing method of the present invention is composed of particles that have an approximately spherical shape and a uniform particle diameter, and even in the case where the particles are fine particles having a mean primary particle diameter of not more than 0.3 μm, the powder exhibits excellent dispersibility, forming property, and sinterability, thereby suitable for forming thin sheet by means of a doctor blade froming method). Besides, the powder composed of fine particles decrease the sintering temperature, causes a sintered product to have fine grain size), thereby increasing a strength of the sintered product. Therefore, in the case of a titanate salt, it is preferable as a material for multilayer capacitors, actuators, filters, etc.

EXAMPLES

The following Examples will illustrate the present invention, but the present invention is not limited to these examples.

1. Observation of Particle Shape

A shape of particles with a primary particle diameter was determined by observing a powder with a scanning electron microscope (SEM, Model T-300 produced by JEOL Ltd.).

2. Evaluation of Mean Primary Particle Diameter

To determine the mean primary particle diameter, a BET specific surface of the powder was determined (by means of "Flowsorb II230" produced by Shimadzu Corporation, and a BET specific equivalent diameter was derived therefrom and was used as the mean primary particle diameter.

3. Evaluation of Crystal Structure

A crystalline structure was determined by means of "X-ray diffractometer RU200" produced by Rigaku International Corporation.

4. Measurement of Temperature at which Transition from Metal Salt Material to Complex Metal Oxide Occurs In the following experiments, a metal salt material was measured by TG-DTA, so that a temperature at which the transition to a complex metal oxide occurred was determined. Measurement by TG-DTA was carried out under the condition that a sample was heated from room temperature at a rate of 10° C./min, and a temperature at which a peak of exothermic reaction started was determined as a temperature of the transition to a complex metal oxide. For TG-DTA, "TG-DTA 2000" produced by MAC Science Co. Ltd. was used.

Example 1

Ignition losses (a loss of weight when moisture is removed by calcining to 1100° C. to obtain an oxide) of barium carbonate (produced by Kanto Kagaku, guaranteed reagent) and titanium oxide (produced by Ishihara Sangyo Kaisha, Ltd., TTO-55N Grade) were determined, and deviations in the weight due to volatilization of water and other volatile components are corrected according to the data of the ignition losses, so that barium carbonate and titanium oxide were weighed so as to have a molar ratio of 1:1. These materials were mixed by a dry ball mill using a polyethylene pot and a plastic ball with an iron core. When the mixture was heated to 800° C. as a temperature of the transition to a complex metal oxide, a gas composed of 5% of hydrogen chloride and 95% of oxygen was fed therein, and the calcination at the foregoing temperature was continued for two hours. A powder obtained was single-phase $BaTiO_3$, and had a mean primary particle diameter of 0.13 μm. Particles of the powder were in an approximately spherical and uniform shape.

Example 2

Titanium oxide ("A-100" produced by Ishihara Sangyo Kaisha, Ltd.) different from that in Example 1 was used, and was mixed with barium carbonate in the same manner as that in Example 1. When the mixture was heated to 850° C. as a temperature of the transition to a complex metal oxide, a mixture gas composed of 5% of hydrogen chloride and 95% of air was fed to the atmosphere, and the calcination was continued for two hours.

Example 3

Neutralized titanic acid synthesized by neutralization by means of titanium tetrahydrate was calcined at 600° C. to obtain titania, which was then mixed with barium carbonate in the same manner as that in Example 1. When the mixture was heated to 800° C. as a temperature of the transition to a complex metal oxide, a mixture gas composed of 5% of hydrogen chloride and 95% of air was fed to the atmosphere, and the calcination was continued for two hours.

Example 4

An experiment was carried out in the same manner as that in Example 1 except that the calcination temperature was set to be 750° C. and the calcination period was set to be one hour.

Example 5

An experiment was carried out in the same manner as that in Example 1 except that the calcination temperature was set to be 850° C. and the calcination period was set to be one hour.

Example 6

An experiment was carried out in the same manner as that in Example 1 except that the concentration of hydrogen chloride was set to be 3% and the calcination period was set to be one hour.

Comparative Example 1

Titanium oxide and barium carbonate were mixed at a molar rate of 1:1 in the same manner as that in Example 1, and the mixture was calcined in air at 800° C. According to analysis by X-ray diffraction, barium titanate was produced, but barium carbonate remained, and further, presence of titanium oxide and barium oxide was observed (described as "multi-phase" in Table 1). A non-uniform primary particle diameter was obtained.

Comparative Example 2

An experiment was carried out in the same manner as that in Example 1 except that hydrogen chloride gas was fed since a stage of room temperature. The powder after the calcination contained chlorides, and hence, it was a multi-phase mixture.

Example 7

Ignition losses (a loss of weight when moisture is removed by calcining to 1100° C. to obtain an oxide) of barium carbonate (produced by Kanto Kagaku, guaranteed reagent), barium fluoride (produced by Nacalai Tesque, guaranteed reagent), and titanium oxide (produced by Ishihara Sangyo Kaisha, Ltd., TTO-55N Grade) were determined, and deviations in the weight due to volatilization of water and other volatile components are corrected according to the data of the ignition losses, so that barium carbonate, barium fluoride, and titanium oxide were weighed so as to have a molar ratio of 0.98:0.02:1. As a result, a molar ratio between a total molar amount of Ba and a molar amount of Ti was 1:1. These materials were mixed by a dry ball mill using a polyethylene pot and a plastic ball with an iron core. The mixture was calcined at 700° C. in air. A powder obtained was single-phase $BaTiO_3$, and had a mean primary particle diameter of 0.1 μm. Particles of the powder were in an approximately spherical and uniform shape. Conditions and results of the experiment are shown in Table 1. In Table 1, the material mixture molar ratio refers to a molar ratio of titanium compounds (other then halogen compounds): barium carbonate: arium halide s calculated using the data of the ignition losses.

Example 8

An experiment was carried out in the same manner as that in Example 7 except that the molar ratio between barium carbonate and barium fluoride was set to be 99.5:0.5.

Example 9

An experiment was carried out in the same manner as that in Example 7 except that the molar ratio between barium carbonate and barium fluoride was set to be 95:5.

Example 10

An experiment was carried out in the same manner as that in Example 7 except that the calcination temperature was set to be 800° C.

Example 11

An experiment was carried out in the same manner as that in Example 7 except that the calcination temperature was set to be 900° C.

Example 12

An experiment was carried out in the same manner as that in Example 7 except that barium chloride (produced by Nacalai Tesque, guaranteed reagent) was used in place of barium fluoride and the calcination was carried out at 800° C.

Example 13

An experiment was carried out in the same manner as that in Example 7 except that barium bromide was used in place of barium fluoride and the calcination was carried out at 800° C.

Example 14

An experiment was carried out in the same manner as that in Example 7 except that titania sol synthesized by neutralization of titanium tetrahydrate (produced by Nacalai Tesque, guaranteed reagent) was used as a compound of titanium other than halogenated titanium.

Conditions and results of the foregoing experiments are shown in Table 1. It should be noted that the material mixture molar ratio in Table 1 refers to a molar ratio of titanium salt: arium salt calculated using the data of the ignition losses.

TABLE 1

| | Source of titanium | Source of barium | Concentration of hydrogen chloride (%) | Calcination temperature (° C.) |
|---|---|---|---|---|
| Example 1 | Titanium oxide | Barium carbonate | 5 | 800 |
| Example 2 | Titanium oxide | Barium carbonate | 5 | 850 |
| Example 3 | Titanium oxide | Barium carbonate | 5 | 800 |
| Example 4 | Titanium oxide | Barium carbonate | 5 | 750 |
| Example 5 | Titanium oxide | Barium carbonate | 5 | 850 |
| Example 6 | Titanium oxide | Barium carbonate | 3 | 800 |
| Example 7 | Titanium oxide | Barium fluoride | 2[1] | 700 |
| Example 8 | Titanium oxide | Barium fluoride | 0.5[1] | 700 |
| Example 9 | Titanium oxide | Barium fluoride | 5[1] | 700 |
| Example 10 | Titanium oxide | Barium fluoride | 2[1] | 800 |
| Example 11 | Titanium oxide | Barium fluoride | 2[1] | 900 |
| Example 12 | Titanium oxide | Barium chloride | 2[1] | 800 |
| Example 13 | Titanium oxide | Barium bromide | 2[1] | 800 |
| Example 14 | Titania sol | Barium fluoride | 2[1] | 700 |
| Comparative example 1 | Titanium oxide | Barium carbonate | 0 | 800 |
| Comparative example 2 | Titanium oxide | Barium carbonate | from room temp. | 800 |
| Comparative example 3 | Titanium oxide | Barium carbonate | 5 | 500 |
| Comparative example 4 | Titanium oxide | Barium carbonate | 5 | 1100 |

| | Calcination period (hr) | Crystalline phase | Primary particle diameter ($\mu$m) | Shape |
|---|---|---|---|---|
| Example 1 | 2 | $BaTiO_3$ | 0.13 | Sphere |
| Example 2 | 2 | $BaTiO_3$ | 0.2 | Sphere |
| Example 3 | 2 | $BaTiO_3$ | 0.16 | Sphere |
| Example 4 | 1 | $BaTiO_3$ | 0.11 | Sphere |
| Example 5 | 1 | $BaTiO_3$ | 0.15 | Sphere |
| Example 6 | 1 | $BaTiO_3$ | 0.12 | Sphere |
| Example 7 | 6 | $BaTiO_3$ | 0.1 | Sphere |
| Example 8 | 6 | $BaTiO_3$ | 0.1 | Sphere |
| Example 9 | 6 | $BaTiO_3$ | 0.1 | Sphere |
| Example 10 | 6 | $BaTiO_3$ | 0.1 | Sphere |
| Example 11 | 6 | $BaTiO_3$ | 0.2 | Sphere |
| Example 12 | 6 | $BaTiO_3$ | 0.1 | Sphere |
| Example 13 | 6 | $BaTiO_3$ | 0.1 | Sphere |
| Example 14 | 6 | $BaTiO_3$ | 0.1 | Sphere |
| Comparative example 1 | 2 | multi-phase | not-measured | non-uniform |
| Comparative example 2 | 2 | multi-phase | not-measured | non-uniform |
| Comparative example 3 | 2 | multi-phase | not-measured | non-uniform |
| Comparative example 4 | 2 | multi-phase | not-measured | non-uniform |

[1] Mol % of Barium fluoride. Barium carbonate + barium fluoride = 100 mol %.

The producing method of the present invention enables production of a complex metal oxide powder composed of fine particles, each in an approximately spherical shape, and a perovskite-structure oxide powder produced by the present method excels in dispersiveness, moldability, and calcinability, thereby suitable for use in electronic components, particularly multilayer capacitors, actuators, filters, etc.

What is claimed is:

1. A method for producing a complex metal oxide powder comprising:

heating at least two metal salts, or a complex metal salt comprising two different metals, at a hydrogen halide gas concentration of not more than about 0.1 vol%, to a temperature at which transition to a complex metal oxide occurs, and calcining the metal salts or the complex metal salt in the presence of a hydrogen halide gas.

2. The method according to claim 1, wherein a concentration of the hydrogen halide gas in the calcining is from about 0.1 vol% to about 10 vol%.

3. The method according to claim 1, wherein at least one metal salt is a metal halide salt, and at least one metal salt is a non metal halide salt.

4. The method according to claim 1, wherein the complex metal salt comprises at least two different metal atoms, a halogen atom, and a non-halogen atom.

5. The method according to claim 4, wherein each non metal halide salt is made of the same metal as one of the metal halide salts.

6. The method according to claim 5, wherein the metal halide salt and the non metal halide salt made of the same metal are at a molar ratio in a range of 99.9:0.1 to 90:10.

7. The method according to claim 1, wherein a temperature of the calcination is from about 5000° C. to about 10000° C.

8. The method according to claim 1, wherein the complex metal oxide powder is a perovskite-structure oxide powder.

9. The method according to claim 8, wherein the perovskite-structure oxide powder comprises a titanate.

* * * * *